United States Patent
Kim et al.

(10) Patent No.: US 9,203,635 B2
(45) Date of Patent: Dec. 1, 2015

(54) METHOD AND APPARATUS FOR BROADCASTING A MAC CONTROL MESSAGE IN WIRELESS ACCESS SYSTEM

(75) Inventors: Jeongki Kim, Anyang-si (KR); Jinsam Kwak, Anyang-si (KR); Giwon Park, Anyang-si (KR); Yongsoo Yuk, Anyang-si (KR)

(73) Assignee: LG ELECTRONICS INC., SEOUL (KR)

( * ) Notice: Subject to any disclaimer, the term of this patent is extended or adjusted under 35 U.S.C. 154(b) by 0 days.

(21) Appl. No.: 14/363,764

(22) PCT Filed: Sep. 6, 2012

(86) PCT No.: PCT/KR2012/007151
§ 371 (c)(1),
(2), (4) Date: Aug. 27, 2014

(87) PCT Pub. No.: WO2013/085138
PCT Pub. Date: Jun. 13, 2013

(65) Prior Publication Data
US 2014/0376442 A1    Dec. 25, 2014

Related U.S. Application Data

(60) Provisional application No. 61/568,157, filed on Dec. 8, 2011.

(30) Foreign Application Priority Data

Mar. 29, 2012   (KR) .................. 10-2012-0032346

(51) Int. Cl.
*H04L 12/18* (2006.01)
*H04W 4/06* (2009.01)
(Continued)

(52) U.S. Cl.
CPC ............ *H04L 12/189* (2013.01); *H04B 7/2612* (2013.01); *H04W 4/005* (2013.01); *H04W 4/06* (2013.01); *H04W 72/005* (2013.01); *H04W 72/0406* (2013.01)

(58) Field of Classification Search
None
See application file for complete search history.

(56) References Cited

U.S. PATENT DOCUMENTS

2005/0041573 A1* 2/2005 Eom et al. .................. 370/208
2007/0253367 A1* 11/2007 Dang et al. ................. 370/329
(Continued)

FOREIGN PATENT DOCUMENTS

WO    2011/116849    9/2011

OTHER PUBLICATIONS

Rui Huang, et al., "M2M group identifier functionalities and design requirements", IEEE 802.16 Broadband Wireless Access Working Group, IEEE C802.16p-11/0152r1, Jul. 2011, 5 pages.
(Continued)

*Primary Examiner* — Christine Duong
(74) *Attorney, Agent, or Firm* — Lee, Hong, Degerman, Kang & Waimey

(57) ABSTRACT

A wireless access system supporting an M2M environment and, more particularly, a method and apparatus for broadcasting a Medium Access Control (MAC) control message respective to an M2M device is disclosed herein. According to an exemplary embodiment, a method for broadcasting a control message to the M2M device in a wireless access system may include the steps of receiving a downlink MAP information element (IE), wherein the downlink MAP IE includes resource assignment information indicating a resource region, to which the control message is being transmitted, and an M2M management CID, and receiving a Medium Access Control Protocol Data Unit (MAC PDU), wherein the MAC PDU carries the control message being broadcasted from the resource region. At this point, the MAC PDU may include the M2M management CID and an M2M connection identifier (M2MCID), and the M2MCID may identify a M2M group to which the corresponding M2M device belongs.

16 Claims, 6 Drawing Sheets

(51) Int. Cl.
*H04W 4/00* (2009.01)
*H04W 72/04* (2009.01)
*H04B 7/26* (2006.01)
*H04W 72/00* (2009.01)

(56) References Cited

U.S. PATENT DOCUMENTS

| | | | |
|---|---|---|---|
| 2009/0097426 A1* | 4/2009 | Yin | 370/311 |
| 2010/0111061 A1* | 5/2010 | Zheng et al. | 370/338 |
| 2012/0142268 A1* | 6/2012 | Tao et al. | 455/3.05 |
| 2012/0276945 A1* | 11/2012 | Chindapol et al. | 455/525 |

OTHER PUBLICATIONS

Eldad Zeira, "Authenticated Validity for M2M devices", IEEE 802.16 Broadband Wireless Access Working Group, IEEE C802.16p-11/0134rl, Jul. 2010, 5 pages.

Soojung Jung, et al., "Connection management for multicast operation of M2M group", IEEE 802.16 Broadband Wireless Access Working Group, IEEE C802.16p-11/0021, Mar. 2011, 4 pages.

Jeongki Kim, et al., "Reliable multicast data transmission" IEEE 802.16 Broadband Wireless Access Working Group, IEEE 802.16p-11/0173, Jul. 2011, 9 pages.

PCT International Application No. PCT/KR2012/007151, Written Opinion of the International Searching Authority dated Feb. 25, 2013, 9 pages.

Agiwal, et al., "MGID, CID and Service flows," IEEE 802.16 Broadband Wireless Access Working Group, IEEE C80216p-11/0290, Nov. 2011, 4 pages.

Tarradell, et al., "M2M Group MAC Control Message (MGMC)," IEEE 802.16 Broadband Wireless Access Working Group, IEEE C802.16p-11_0273r3, Sep. 2011, 5 pages.

* cited by examiner

METHOD AND APPARATUS FOR BROADCASTING A MAC CONTROL MESSAGE IN WIRELESS ACCESS SYSTEM

CROSS-REFERENCE TO RELATED APPLICATIONS

This application is the National Stage filing under 35 U.S.C. 371 of International Application No. PCT/KR2012/007151, filed on Sep. 6, 2012, which claims the benefit of earlier filing date and right of priority to Korean Application No. 10-2012-0032346, filed on Mar. 29, 2012, and also claims the benefit of U.S. Provisional Application Ser. No. 61/568,157 filed on Dec. 8, 2011, the contents of which are all hereby incorporated by reference herein in their entirety.

TECHNICAL FIELD

The present invention relates a wireless access system supporting an M2M environment and, more particularly, to a method and apparatus for broadcasting a medium access control (MAC) message.

BACKGROUND ART

Hereinafter, a Machine to Machine environment according to the present invention will be briefly described.

Herein, a M2M (Machine to Machine) literally refers to a communication between an electronic device (or machine) and another electronic device (or machine). As a broader definition, M2M refers to a wireless or wired communication between electronic devices, or to a communication between a user-controlled device and a machine. However, recently, M2M has generally been defined as a wireless communication between an electronic device and another electronic device without any human involvement.

When the concept of M2M communication was first adopted in the early 1990's, M2M communication was merely understood and recognized as the concept of remotely controlled communication or telematics, and the related market was also limited to such concept. However, over the past few years, M2M communication has been under development at a remarkable rate and has now evolved to a market drawing worldwide attention. Most particularly, the M2M communication has greatly influenced diverse fields including Fleet Management, remote monitoring of devices and equipments, smart meter for measuring the operation time of a construction equipment installation and for automatically measuring the usage amount of heat or electricity in an applied market related to the POS (Point of Sales) and security. The M2M communication that is to be used in the future is expected to be used and applied for a wider scope of usage in association with the conventional mobile communication and high speed wireless internet or low power communication solutions, such as Wi-Fi and Zigbee, thereby becoming the basis for expanding its market domain to the B2C (Business to Customer) market, and not being limited only to the B2B (Business to Business) market.

In the age of M2M communication, all types of machines (or devices) equipped with a SIM (Subscriber Identity Module) card may perform data reception and transmission, thereby being capable of being remotely controlled and managed. For example, being applied to an extended range of devices and equipments, such as cars, trucks, trains, containers, vending machines, gas tanks, and so on, the M2M communication technology may be applied to an enormous range of application.

In the related art, a user equipment was generally managed in individual units. Therefore, a one-to-one communication was generally performed between a base station and a user equipment. For example, when it is assumed that a large number of M2M devices (or machines) each performs a one-to-one communication with the base station, a network overload is expected to occur due to an excessive amount signaling that is generated between each of the M2M devices and the base station. As described above, when the M2M communication is being extended and being performed at a vast range, an overhead occurring during the communication between the M2M devices or between the each of the M2M devices and the base station may become a problem.

Also, as the usage of the M2M devices is becoming more active, an environment having the general user equipments co-exist with the M2M devices may be configured. Therefore, when the conventional communication is used without any modification, a problem may occur in that the user equipment is be required to decode all of the messages respective to the M2M devices.

For example, if broadcast data or multicast data are transmitted from the base station as one-to-many messages, without any distinction between the M2M devices and the general user equipment, the general user equipment and the M2M devices are required to decode all of the broadcast data. Therefore, the power consumption level may be increased abruptly. Furthermore, the user equipment or each of the M2M devices may fail to receive the data, which the corresponding user equipment or the corresponding M2M device was initially intended to receive.

Additionally, since the MAC control messages, which are being transmitted with respect to the M2M devices, are transmitted in a broadcast format, even when a transmitted MAC control message (e.g., MOB-MTE-IND, MGMC) does not correspond to a message respective to a M2M group, to which the corresponding M2M device belongs, the M2M device may first decode a burst respective to the MOB-MTE-IND message. Then, after verifying (or determining) an M2MCID included in the MAC control message, the M2M device is required to perform a process of verifying (or determining) whether or not the corresponding M2M device group is the M2M device group, to which the corresponding M2M device belongs.

In this case, at the point when the base station is to transmit the MAC control messages, when the corresponding messages include only the information respective to a single M2M group, other M2M devices that do not belong to the corresponding group and other general user equipment may have to receive unnecessary MAC control messages.

DISCLOSURE OF INVENTION

Technical Problem

In order to resolve the above-described general technical problems, an object of the present invention is to provide an efficient communication method for M2M devices.

Another object of the present invention is to define M2M device dedicated messages and to provide a method for transmitting such messages.

Another object of the present invention is to provide a method for allowing a device to receive only the MAC control messages respective to the M2M group, to which the corresponding device belongs, even if the device corresponds to an M2M device.

Another object of the present invention is to provide a method for transmitting MAC control messages in a broadcast manner in order to reduce unnecessary burst decoding overhead of the general user equipments and also to reduce unnecessary operations of the M2M devices.

A further object of the present invention is to provide methods for efficiently broadcasting dedicated messages for M2M devices by separating general user equipments and M2M devices, while ensuring maximum backward compatibility with the conventional technology.

The technical objects of the present invention will not be limited only to the objects described above. Accordingly, additional technical objects of the present application will be set forth in part in the description which follows and in part will become apparent to those having ordinary skill in the art upon examination of the following or may be learned from practice of the present application.

Solution to Problem

To achieve these objects and other advantages and in accordance with the purpose of the invention, as embodied and broadly described herein, being relates to a wireless access system supporting an M2M environment, the present invention provides a method and apparatus for broadcasting a Medium Access Control (MAC) control message.

In an aspect of the present invention, a method for broadcasting a control message for an M2M device may comprise steps of receiving a downlink MAP information element (IE) including resource assignment information indicating a resource region to which the control message is being transmitted and an M2M management CID; and receiving a Medium Access Control Protocol Data Unit (MAC PDU) carries the control message being broadcast through the resource region. In this case, the MAC PDU includes the M2M management CID and an M2M connection identifier (M2MCID) identifying a M2M group to which the corresponding M2M device belongs.

In another aspect of the present invention, a method for broadcasting a control message for an M2M device may comprise steps of transmitting a downlink MAP information element (IE) including resource assignment information indicating a resource region to which the control message is being transmitted and an M2M management CID; and transmitting a Medium Access Control Protocol Data Unit (MAC PDU) carries the control message being broadcast through the resource region. In this case, the MAC PDU includes the M2M management CID and an M2M connection identifier (M2MCID) identifying a M2M group to which the corresponding M2M device belongs.

In yet another aspect of the present invention, a M2M device for receiving a control message being broadcasted may comprise a receiver and a processor controlling the reception of the broadcasted control message.

At this point, the M2M device is configured to receive a downlink MAP information element (IE) by using the receiver, wherein the downlink MAP IE includes resource assignment information indicating a resource region to which the control message is being transmitted and an M2M management CID; and receive a Medium Access Control Protocol Data Unit (MAC PDU) by using the receiver, wherein the MAC PDU carries the control message being broadcast through the resource region. In this case, the MAC PDU includes the M2M management CID and an M2M connection identifier (M2MCID) identifying a M2M group to which the corresponding M2M device belongs.

In a further aspect of the present invention, a base station for broadcasting a control message to an M2M device may comprise a transmitter and a processor controlling the broadcasting of the control message.

At this point, the base station is configured to transmit a downlink MAP information element (IE) by using the transmitter, wherein the downlink MAP IE includes resource assignment information indicating a resource region to which the control message is being transmitted and an M2M management CID; and transmit a Medium Access Control Protocol Data Unit (MAC PDU) by using the transmitter, wherein the MAC PDU carries the control message being broadcast through the resource region. In this case, the MAC PDU includes the M2M management CID and an M2M connection identifier (M2MCID) identifying a M2M group to which the corresponding M2M device belongs.

In the various aspects of the present invention, the M2M management CID may be used in the downlink MAP IE to indicate a burst being configured to transmit downlink broadcast information for the M2M device.

Also, the M2M management CID may be included in a MAC header, the MAC header being included in the MAC PDU, and the M2MCID may be included in a payload, the payload being included in the MAC PDU. At this point, the MAC header may further include an encryption control (EC) field indicating whether or not the control message is encrypted, the control message being included in the payload.

Also, the control message may be an M2M multicast end indication (MOB-MTE-IND) message or an M2M group MAC control (MGMC) message.

The above-described embodiments of the present invention are merely a portion of the preferred embodiments of the present invention. And, it is to be understood that both the foregoing general description and the following detailed description of the present invention are exemplary and explanatory and are intended to provide further explanation of the invention as claimed.

Advantageous Effects of Invention

To achieve these objects and other advantages and in accordance with the purpose of the invention, as embodied and broadly described herein, being relates to a wireless access system supporting an M2M environment, the present invention provides a method and apparatus for broadcasting a Medium Access Control (MAC) control message.

In an aspect of the present invention, a method for broadcasting a control message for an M2M device may comprise steps of receiving a downlink MAP information element (IE) including resource assignment information indicating a resource region to which the control message is being transmitted and an M2M management CID; and receiving a Medium Access Control Protocol Data Unit (MAC PDU) carries the control message being broadcast through the resource region. In this case, the MAC PDU includes the M2M management CID and an M2M connection identifier (M2MCID) identifying a M2M group to which the corresponding M2M device belongs.

In another aspect of the present invention, a method for broadcasting a control message for an M2M device may comprise steps of transmitting a downlink MAP information element (IE) including resource assignment information indicating a resource region to which the control message is being transmitted and an M2M management CID; and transmitting a Medium Access Control Protocol Data Unit (MAC PDU) carries the control message being broadcast through the resource region. In this case, the MAC PDU includes the M2M management CID and an M2M connection identifier (M2MCID) identifying a M2M group to which the corresponding M2M device belongs.

In yet another aspect of the present invention, a M2M device for receiving a control message being broadcasted may comprise a receiver and a processor controlling the reception of the broadcasted control message.

At this point, the M2M device is configured to receive a downlink MAP information element (IE) by using the receiver, wherein the downlink MAP IE includes resource assignment information indicating a resource region to which the control message is being transmitted and an M2M management CID; and receive a Medium Access Control Protocol Data Unit (MAC PDU) by using the receiver, wherein the MAC PDU carries the control message being broadcast through the resource region. In this case, the MAC PDU includes the M2M management CID and an M2M connection identifier (M2MCID) identifying a M2M group to which the corresponding M2M device belongs.

In a further aspect of the present invention, a base station for broadcasting a control message to an M2M device may comprise a transmitter and a processor controlling the broadcasting of the control message.

At this point, the base station is configured to transmit a downlink MAP information element (IE) by using the transmitter, wherein the downlink MAP IE includes resource assignment information indicating a resource region to which the control message is being transmitted and an M2M management CID; and transmit a Medium Access Control Protocol Data Unit (MAC PDU) by using the transmitter, wherein the MAC PDU carries the control message being broadcast through the resource region. In this case, the MAC PDU includes the M2M management CID and an M2M connection identifier (M2MCID) identifying a M2M group to which the corresponding M2M device belongs.

In the various aspects of the present invention, the M2M management CID may be used in the downlink MAP IE to indicate a burst being configured to transmit downlink broadcast information for the M2M device.

Also, the M2M management CID may be included in a MAC header, the MAC header being included in the MAC PDU, and the M2MCID may be included in a payload, the payload being included in the MAC PDU. At this point, the MAC header may further include an encryption control (EC) field indicating whether or not the control message is encrypted, the control message being included in the payload.

Also, the control message may be an M2M multicast end indication (MOB-MTE-IND) message or an M2M group MAC control (MGMC) message.

The above-described embodiments of the present invention are merely a portion of the preferred embodiments of the present invention. And, it is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and which are incorporated in and constitute a part of this application, illustrate embodiment(s) of the invention and together with the description serve to explain the principle of the invention.

BEST MODE FOR CARRYING OUT THE INVENTION

Figure 1:
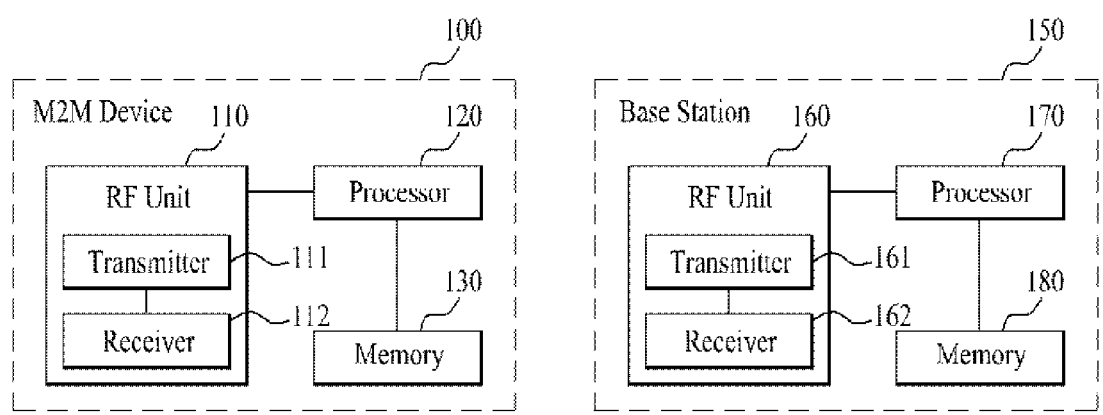
FIG. 1 illustrates a general view showing the configuration of devices, such as an M2M device, a base station, and so on, according to an exemplary embodiment of the present invention.

The exemplary embodiments of the present invention provide a method and apparatus for broadcasting a Medium Access Control (MAC) control message in a wireless access system supporting the M2M environment.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In order to avoid any ambiguity in the concept (or idea) of the present invention, some of the structures and devices disclosed (or mentioned) in the present invention may be omitted from the description of the accompanying drawings of the present invention. Also, any procedure or step that can be easily understood by anyone skilled in the art has also been excluded from the description of the present invention.

In the description of the present invention, the embodiments of the present invention will be described by mainly focusing on the data transmission and reception relation between a base station and a mobile station. Herein, the base station may refer to a terminal node of the network that performs direct communication with the mobile station. Occasionally, in the description of the present invention, particular operations of the present invention that are described as being performed by the base station may also be performed by an upper node of the base station.

More specifically, in a network consisting of multiple network nodes including the base station, diverse operations that are performed in order to communicate with the terminal may be performed by the base station or network nodes other than the base station. Herein, the term 'Base Station (BS)' may be replaced by other terms, such as fixed station, Node B, eNode B (eNB), ABS (Advanced Base Station), or Access Point (AP).

Additionally, the term 'MS (Mobile Station)' may be replaced by terms including UE (User Equipment), SS (Subscriber Station), MSS (Mobile Subscriber Station), Mobile Terminal, AMS (Advanced Mobile Station) or Terminal. Most particularly, in the description of the present invention, the mobile station may be used to have the same meaning as the M2M device.

Additionally, the transmitting end refers to a fixed and/or mobile node providing data services or audio services (or voice services), and the receiving end refers to a fixed and/or mobile node receiving data services or audio services (or voice services). Therefore, in an uplink, the mobile station may become the transmitting end, and the base station may become the receiving end. And, similarly, in a downlink, the mobile station may become the receiving end, and the base station may become the transmitting end.

The exemplary embodiments of the present invention may be supported by the standard documents that are disclosed in at least any one of the diverse wireless access systems, such as an IEEE 802.xx system, a 3GPP system, a 3GPP LTE system, and a 3GPP2 system. More specifically, among the exemplary embodiments of the present invention, reference may be made to the above-mentioned documents for the description of obvious process steps or elements of the present invention that have not been described herein.

Furthermore, all of the terms mentioned in the description of the present invention may be described and defined with reference to the standard documents. Most particularly, the exemplary embodiments of the present invention may be supported by at least one or more of the P802.16e-2004, P802.16e-2005, P802.16m, P802.16p, and P802.16.1b standard documents, which correspond to the standard documents for the IEEE 802.16 system.

Hereinafter, the preferred embodiments of the present invention will be described in detail with reference to the accompanying drawings. The detailed description of the present invention that is disclosed as follows with reference to the accompanying drawings is merely the description of exemplary embodiments of the present invention. And, therefore, the description of the present invention does not seek to represent a unique embodiment of the present invention.

Reference will now be made in detail to the preferred embodiments of the present invention, examples of which are illustrated in the accompanying drawings, so that anyone skilled in the art can easily implement the embodiments of the present invention. However, it will be apparent that the present invention may be implemented in a variety of different structures, and, therefore, the present invention will not be limited only to the exemplary embodiments presented herein. Furthermore, in the accompanying drawings, in order to clearly describe the embodiments of the present invention, any parts irrelevant to the description of the present invention will be omitted. And, wherever possible, similar reference numbers will be used throughout the drawings to refer to the same or like parts.

Throughout the entire description of the present invention, when a particular part is said to "comprise (or include)" a specific element, unless specifically written or indicated otherwise, this does not signify that another element is excluded from the specific part but signifies that the specific part may also include other elements. Also, terms such as " . . . unit", " . . . device", " . . . module", and so on, which are indicated in the description of the present invention, indicates units that process at least one function or operation. And, this may be realized in the form of hardware or software, or a combination of hardware and software.

The specific terms used in the following embodiments of the present invention are provided to facilitate the understanding of the present invention. And, therefore, without deviating from the technical scope and spirit of the present invention, such specific terms may also be varied and/or replaced by other terms.

1. M2M Devices in General

Hereinafter, communication between M2M devices refers to a communication format, which is performed between user equipments passing through (or being connected with) the base station, or which is performed between a base station and user equipments without any human involvement, or refers to a communication format, which is performed between M2M devices. Therefore, an M2M Device refers to a user equipment that may be provided with support for performing communication with the above-described M2M devices.

An access service network for M2M services may be defined as an M2M ASN (M2M Access Service Network), and a network entity communicating with the M2M devices may be referred to as an M2M server. Herein, the M2M server performs M2M application and provides an M2M specific service for one or more M2M devices. An M2M feature corresponds to a characteristic (or feature) of an M2M application. And, herein, at least one or more features (or characteristics) are required for providing an application. An M2M device group refers to a group of M2M devices sharing at least one or more common characteristics (or features).

Within a consistent network, a number of devices communicating via M2M communication (i.e., such devices may be diversely referred to as M2M devices, M2M communication devices, MTC (Machine Type Communication) devices, and so on) may gradually increase in accordance with an increase in the respective Machine Application Type.

Herein, the Machine Application Types may include (1) security, (2) public safety, (3) tracking and tracing, (4) payment, (5) healthcare, (6) remote maintenance and control, (7) metering, (8) consumer device, (9) Fleet Management in an application market related to POS (Point of Sales) and security, (10) communication between devices in Vending Machines, (11) remote monitoring of machines and equipments, (12) Surveillance Video communication of surveillance cameras, and so on. However, the Machine Application types are not required to be limited only to the above-mentioned types. And, therefore, other variety of machine application types may also be applied herein.

As another characteristic of the M2M device, the M2M device has the characteristic of low mobility or the characteristic of scarcely once the corresponding M2M device is installed. More specifically, this signifies that the M2M device is stationary for a considerably long period of time. An M2M communication system may simplify or maximize mobility-related (or mobility-associated) operations for a specific M2M application having a fixed position, such as secured access surveillance, public safety, payment, remote maintenance and control, metering, and so on.

As described above, with the increase in the device application type, the number of M2M communication devices may drastically increase as compared to the number of general mobile communication devices. Therefore, when each of the above-described M2M communication devices individually performs communication with the base station, a critical load may occur in a wireless interface (or radio interface) and/or a network.

Hereinafter, the exemplary embodiment of the present invention will be described in detail based upon an exemplary case where the M2M communication is applied to a wireless communication system (e.g., P802.16e, P802.16m, P802.16.1b, P802.16p, and so on). However, the present invention will not be limited only to the examples given herein. And, therefore, the present invention may also be applied to other communication systems, such as 3GPP LTE/LTE-A systems.

FIG. 1 illustrates a general view showing the configuration of devices, such as an M2M device, a base station, and so on, according to an exemplary embodiment of the present invention.

Referring to FIG. 1, an M2M device (100) and a base station (150) may each include a radio frequency (RF) unit (110, 160), a processor (120, 170), and may selectively (or optionally) include a memory (130, 180). The example shown in FIG. 1 illustrates the structures of 1 M2M device and 1 base station. However, an M2M communication environment between multiple M2M devices and the base station may also be established.

Each RF unit (110, 160) may respectively include a transmitter (111, 161), and a receiver (112, 162). The transmitter (111) and the receiver (112) of the M2M device (100) may be configured to transmit and receive signals to and from the base station (150) and other M2M devices. And, the processor (120) may be functionally connected to the transmitter (111) and the receiver (112), so as to be capable of controlling the process performed by the transmitter (111) and the receiver (112) for transmitting and receiving signals to and from other devices. Additionally, the processor (120) may first perform diverse processes on the signal that is to be transmitted and, then, transmit the processed signal to the transmitter, and the processor (120) may also perform processes on the signal that is received by the receiver (112).

When required, the processor (120) may store information included in an exchanged message in the memory (130). And, by being configured of the above-described structure, the M2M device (100) may perform the method according to diverse exemplary embodiments of the present invention, which will hereinafter be described in detail.

Meanwhile, although it is not shown in FIG. 1, the M2M device (100) may include diverse additional configurations depending upon the respective device application type. For example, when the corresponding M2M device (100) is designated to perform smart metering, the corresponding M2M device (100) may include an additional configuration for performing power measurement. And, such power measuring operation may be controlled by the processor (120) shown in FIG. 1, and such power measuring operation may also be controlled by a separately configured processor (not shown).

Although FIG. 1 shows an example of a case when communication is performed between the M2M device (100) and the base station (150), the M2M communication method according to the present invention may also be performed between one or more M2M devices. And, being configured to have the same device configuration as the example shown in FIG. 1, each device may perform the method according to diverse exemplary embodiments of the present invention, which will hereinafter be described in detail.

The transmitter (161) and the receiver (162) of the base station (150) may be configured to transmit and receive signals to and from another base station, M2M server, and M2M devices. And, the processor (170) may be functionally connected to the transmitter (161) and the receiver (162), so as to be capable of controlling the process performed by the transmitter (161) and the receiver (162) for transmitting and receiving signals to and from other devices. Additionally, the processor (170) may first perform diverse processes on the signal that is to be transmitted and, then, transmit the processed signal to the transmitter, and the processor (170) may also perform processes on the signal that is received by the receiver (162). When required, the processor (170) may store information included in an exchanged message in the memory (130). And, by being configured of the above-described structure, the base station (150) may perform the method according to diverse exemplary embodiments of the present invention, which will hereinafter be described in detail.

The processor (120, 170) of each of the M2M device (110) and the base station (150) may direct the operations (e.g., control, adjustment, management, and so on) of each of the M2M device (110) and the base station (150). Each of the processors (120, 170) may be connected to the respective memory (130, 180) storing program codes and data. Each memory (130, 180) may be connected to the respective processor (120, 170), so as to store operating systems, applications, and general files.

The processor (120, 170) of the present invention may also be referred to as a controller, a microcontroller, a microprocessor, a microcomputer, and so on. Meanwhile, the processor (120, 170) may be implemented in the form of hardware or firmware, or software, or in a combination of hardware or firmware, and software. In case of implementing the embodiments of the present invention in the form of hardware, the processor (120, 170) may be equipped with ASICs (application specific integrated circuits) or DSPs (digital signal processors), DSPDs (digital signal processing devices), PLDs (programmable logic devices), FPGAs (field programmable gate arrays), and so on, which are configured to perform the present invention.

Meanwhile, in case of implementing the embodiments of the present invention in the form of firmware or software, the firmware or software may be configured to include a module, procedure, or function, which performs the above-described functions or operations of the present invention. And, the firmware or software, which is configured to perform the present invention may be provided in the processor (120, 170) or may be stored in the memory (130, 180), so as to be operated by the processor (120, 170).

2. Idle Mode

Hereinafter, an idle mode of an M2M environment in which the exemplary embodiments of the present invention are to be performed will be described in detail.

An idle mode refers to an operation mode operating a Paging Group, a Paging Cycle, and a Paging Offset for power saving, when an M2M device (i.e., user equipment) does not receive any traffic from the base station for a predetermined period of time.

For example, a user equipment, which has shifted to the idle mode, may receive a broadcast message (e.g., paging message), which is broadcasted by the base station, only during an available interval for paging (or interval available for paging) during a paging cycle, so as to be capable of determining whether the corresponding user equipment should shift to a normal mode or whether the corresponding user equipment should maintain the idle mode.

Additionally, the idle mode corresponds to a mechanism allowing the user equipment to periodically receive a downlink message without being registered to a specific base station (i.e., without having to perform any procedure such as a handover process), even when the user equipment wanders around a vast range within a wireless (or radio) link environment including multiple base stations.

For simplicity in the description of the present invention, the idle mode will be described based upon IEEE 802.16e, 16m, and 16p systems. However, the technical spirit and scope of the present invention will not be limited only to the systems presented herein as the standard systems. In order to initiate a shift to the idle mode, the user equipment transmits a DREG-REQ (Deregistration Request) message to the base station, in order to request for a deregistration process from the corresponding base station.

Thereafter, as a response to the DREG-REQ message, the base station transmits a DREG-RSP (Deregistration Response) message to the corresponding user equipment. At this point, the DREG-RSP message includes Paging Information. Herein, the initiation of the user equipment for shifting to the idle mode may be disclosed upon request from the base station in an unsolicited manner. In this case, the base station transmits the DREG-RSP message to the user equipment.

The Paging Information may include values for a Paging Cycle, a Paging Offset, a PGID (Paging Group IDentifier), and a Paging Listening Interval.

After receiving the DREG-RSP message from the base station, the user equipment refers to the paging information, so as to initiate its shift to the idle mode. The idle mode may include a Paging Cycle, and one paging cycle of the idle mode may be configured of a Paging Listening Interval and an Unavailable Interval. At this point, the Paging Listening Interval may be used as the same concept of an Available Interval or a paging interval.

A paging offset indicates a starting point (e.g., frame or subframe) at which the paging listening interval begins within the paging cycle. Also, a paging group identifier indicates an identifier of a paging group, which is allocated to the user equipment. Moreover, the paging information may include paging message offset information. Herein, the paging message offset information indicates a point at which the paging message is being transmitted from the base station.

Thereafter, the user equipment may use the paging information so as to receive a paging message, which is being transmitted to the corresponding user equipment during the paging listening interval. Herein, the paging message may be transmitted through the base station or a paging controller. More specifically, the user equipment may monitor a radio channel (or wireless channel) in accordance with the paging cycle in order to receive the paging message.

Figure 2:
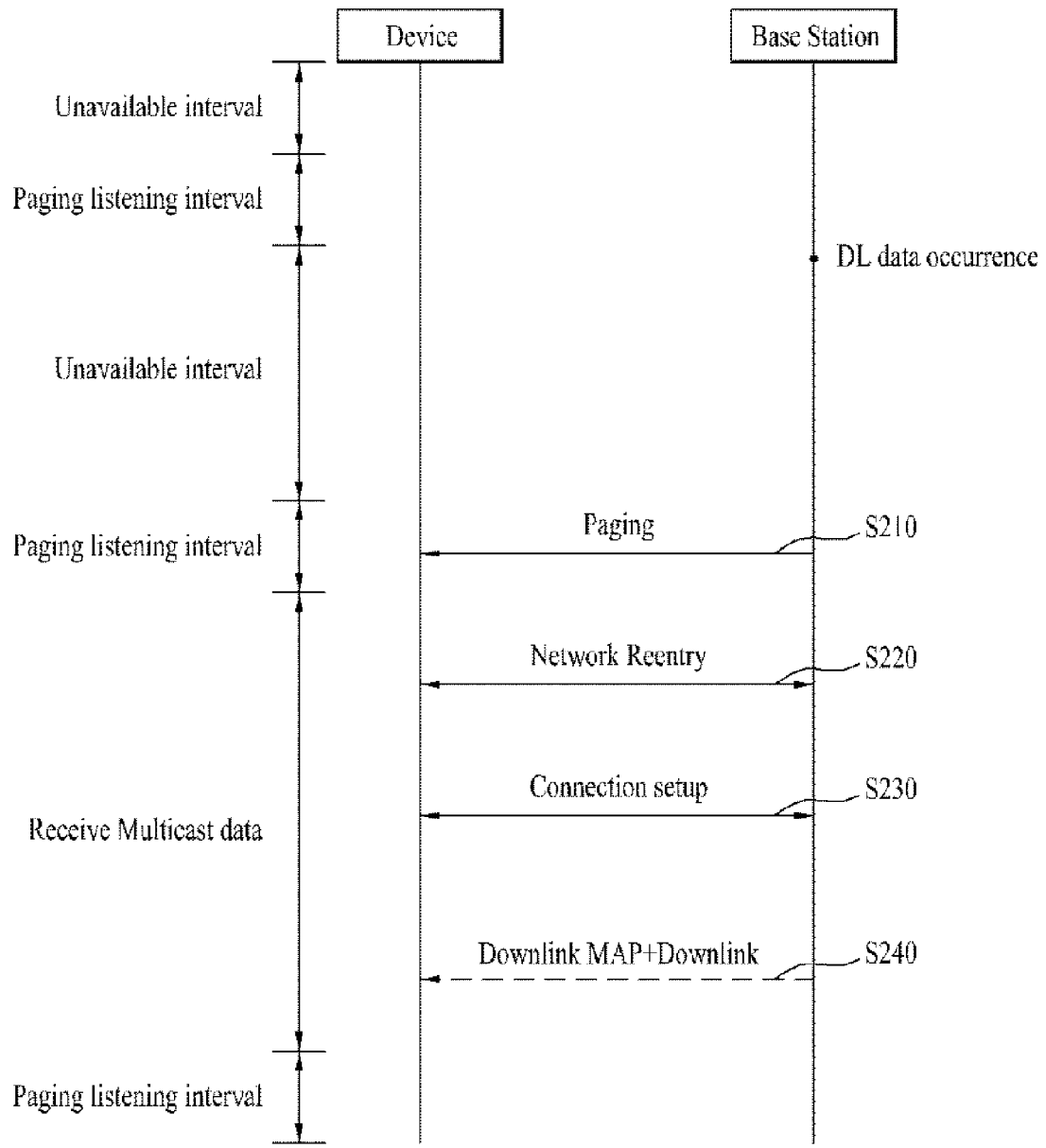
FIG. 2 illustrates a flow chart showing one of many paging methods being performing in an idle mode, which may be applied to the present invention.

FIG. 2 illustrates a flow chart showing one of many paging methods being performing in an idle mode, which may be applied to the present invention.

When data occur (or are generated) in a user equipment, which is being operated in an idle mode, within a paging group to which a base station belongs, the corresponding base station may transmit a paging message to the corresponding user equipment, in order to notify the user equipment of the generated data. Then, the user equipment may receive the transmitted paging message during its paging listening interval, so as to verify the presence or absence of downlink (DL) data that are being delivered to the corresponding user equipment (S210).

If it is determined that downlink data exist (i.e., positive indication), the user equipment performs a ranging process including a network reentry process (S220). Thereafter, the user equipment performs a Connection Setup process, which determines (or sets-up) a connection to a downlink service flow, which is related to the base station, through a DSA (Dynamic Service Addition) process (S230).

After the connection to a service flow is determined (or set-up), the base station transmits downlink control information and downlink data respective to the corresponding service to the user equipment (S240).

In an M2M scenario, since most of the M2M devices do not correspond to a terminal that can be carried (or handheld) by a user, such as a general user equipment, e.g., mobile phones, an automatic application or firmware update process for the M2M devices may correspond to a main application within the M2M service scenario.

For example, in order to update the firmware of each device, an M2M server may transmit updated information to the M2M devices having the corresponding application. In order to transmit such multicast data, which are required to be commonly transmitted to M2M devices that are being operated in the idle mode, the base station shall page the corresponding M2M devices through the paging process, which is described above with reference to FIG. 2.

The user equipments that have been paged (or that have received the paging message) may initiate transmission of a random access code, so as to perform a network reentry process. Accordingly, by accessing (or being connected to) a network, the corresponding user equipments may receive DL traffic transmitted from the base station. However, such processes may increase an unnecessarily excessive usage of the network. Furthermore, in an environment where the M2M devices co-exist with the general user equipments, by having each of the M2M devices and the general user equipment receive unnecessary data, the power consumption level of each user equipment (or terminal) may be increased.

3. Identifiers Used in the Exemplary Embodiments of the Present Invention (1) M2M Multicast Connection Identifier (M2MCID)

An M2M Group Zone corresponds to a logical region including multiple ABSs. An M2M Group zone is identified by an M2M GROUP ZONE ID. The M2M group zone ID may be broadcasted (i.e., transmitted via broadcasting) through a DCD message or a MAP message. An M2MCID (M2M Connection Identifier) is assigned with a unique 16-bit value identifying a downlink multicast service flow, which is shared by a group of M2M devices within an M2M group zone.

The M2M device implicitly draws out a zone index corresponding to an M2M Group Identifier based upon an order of M2M group identifiers within a broadcast message (e.g., DCD message). A first zone index included in the M2M group identifier is assigned with a value 0, and, when the maximum value of the M2M group zone being supported by the base station is defined as 4, the zone index continuously increases to up to MAX_M2M_GROUP_ZONE-1.

In case the ABS corresponds to only a portion of an M2M group zone, the base station broadcasts a single M2M GROUP ZONE_ID, and the M2M devices draw out the corresponding M2M group zone index (0b00). The M2M device group may be found by using the M2MCID and the respective M2M group zone index. All MGIDs are assigned to the M2M devices belonging to the same M2M group zone. Each M2MCID is assigned to a multicast service flow of the M2M devices through a DSA process after an initial network entry process. Also, the M2MCID may explicitly exit the network or may be deactivated when the M2M devices enter the DCR mode. The assigned M2MCID may be maintained even when the M2M devices are being operated in the idle mode. However, when the M2M devices exit the corresponding network, or when the M2M devices explicitly delete the service flow related to the assigned M2MCID, the assigned M2MCID may be deactivated.

The M2M device may be assigned with multiple M2MCIDs respective to various multicast service flows each different from one another. The M2MCID may be reassigned in the connected state and in the Idle mode state. In the connected state, the M2MCID may be modified or deleted through the DSC process and the DSD process. In the Idle Mode state, the M2MCID may be modified through a Location Update (LU) or a network re-entry process.

When the base station seeks to modify the M2MCID respective to all M2M devices within the multicast group, the base station may trigger a group location update through a paging message. When the M2M device performs a timer-based location update, in case the base station requires an M2MCID respective to the corresponding M2M device to be updated, the base station may transmit a ranging response (RNG-RSP) message including a new M2MCID as a response to a ranging request (RNG-REQ) message during the location update process.

The base station may transmit a paging message (e.g., MOB-PAG-ADV) for updating the M2MCID and for indicating a new value for all M2M devices within the group. When the M2M devices belonging to the M2M group, which is identified by the M2MCID, and being operated in the Idle mode receive a paging message including the corresponding M2MCID and an Action Code, which is set to 0b11, the corresponding M2M device should update the M2MCID based upon a new M2MCID value, which is being indicated.

(2) M2M Management Connection Identifier

The exemplary embodiments of the present invention may be applied to an IEEE 802.16e system. In case of an IEEE 802.16e (Rev. 3) system, a CID (Connection Identifier) is used instead of the FID (Flow Identifier).

In addition, a Multicast CID is defined in order to transmit multicast data. However, the conventional multicast CID is only capable of identifying multicast data and cannot identify whether or not multicasting is being used with respect to the M2M device. Also, the Multicast CID has a reduced CID format, which is used in an HARQ zone (or region).

In order to minimize the influence on the conventional general user equipment, which is caused by the adoption of the M2M system, the base station is required to transmit an M2M specific broadcast MAC control message (e.g., MOB-MTE-IND or MGMC) only to the M2M device. In order to do so, in the description of the present invention, an M2M multicast CID and an M2M Management CID are defined, and it will be assumed herein that the M2M Management CID is used only by all of the M2M devices.

Table 1 shown below shows exemplary connection identifiers that may be used in the exemplary embodiments of the present invention.

TABLE 1

| Name | Value | Contents |
| --- | --- | --- |
| Transport, Secondary Management, Tunnel or Management Tunnel, Multicast Management CID | 2m + 1 − n | For the secondary management connection, the same value is assigned to both the DL and UL connection. Tunnel CID is used for tunnel transport connections. Multicast management CID is used for the downlink multicast management services. |

TABLE 1-continued

| Name | Value | Contents |
| --- | --- | --- |
| M2MCID | n + 1 − 0xFE9E | M2M Multicast connection identifier |
| M2M Management CID | 0xFE9F | Used in DL-MAP to denote bursts for transmission of DL broadcast information to M2M devices. May also be used in MOB_MTE-IND/MGMC messages. |

Referring to Table 1, CIDs that are used in the M2M devices as well as in general user equipments include a Transport CID, a Secondary Management CID, a Tunnel or Management Tunnel CID, and a Multicast Management CID. The Transport CID and the Secondary Management CID may be synchronously (or simultaneously) assigned to uplink and downlink connections. The Tunnel CID is used for a Tunnel transport (or transmission) connection. The Multicast management CID is used for downlink multicast management services.

In addition, referring to Table 1, an M2MCID and an M2M Management CID are defined for the M2M devices. The M2MCID is used for identifying an M2M Multicast connection. And, the M2M Management CID is used in a DL-MAP in order to indicate a burst, which is used for transmitting downlink broadcast information to the corresponding M2M device.

In the exemplary embodiments of the present invention, the M2M Management CID is only used for all of the M2M devices. Therefore, in order to assign a resource region, which is used for transmitting a specific MAC control message being dedicated for the M2M devices, such as an MOB-_MTE-IND message or an MOB_MGMC message, the base station may transmit a downlink MAP information element (DL-MAP IE) including resource assignment information to the M2M devices. At this point, the base station may transmit the DL-MAP IE after including the M2M management CID in a CID field of the DL-MAP IE. Since the M2M management CID is assigned only to the M2M devices and not assigned to the general user equipments, the general user equipment fails to (or does not) read the DL-MAP IE being transmitted on the CID, or the general user equipment fails to decode the resource region (or zone) (i.e., DL burst) being indicated in the DL-MAP IE. In Table 1, the value of the M2M Management message is set to 0xFE9F because the system fixedly uses the M2M Management CID. In this case, the base station and the M2M device are not required to perform any additional procedures for assigning the M2M Management CID.

4. Medium Access Control (MAC) Control Message

Hereinafter, the control messages that are used in the exemplary embodiments of the present invention will be described in detail.

(1) Downlink MAP Information Element

A Downlink MAP information element is transmitted by the base station so as to assign a resource region to the user equipments (or devices). Most particularly, in order to assign the resource region for the M2M device, the base station may transmit a DL-MAP IE including the M2M Management CID. At this point, only the M2M devices being assigned with the M2M Management CID may decode the corresponding DL-MAP IE. Table 2 shown below shows an exemplary DL-MAP IE format.

TABLE 2

| Syntax | Size(bit) | Contents |
|---|---|---|
| DL-MAP IE( ){ | | |
| DIUC | 4 | |
| ... | ... | ... |
| N_CID | 8 | Number of CIDs assigned for this IE |
| for (n=0; n<N_CID; n++){ | — | |
| if (included in SUB-DL-UL-MAP){ | — | |
| RCID_IE( ) | — | |
| } else { | — | |
| CID | 16 | |
| } | | |
| } | | |
| } | | |
| OFDMA Symbol offset | | |
| if(Permutation=0b11 and (AMC type is 2×3 or 1×6)){ | | |
| Subchannel offset | | |
| ... | ... | ... |
| Boosting | 3 | 000: Normal(not boosted); 001: +6 dB; 010: −6 dB; 011: +9 dB; 100: +3 dB; 101: −3 dB; 110: −9 dB; 111: −12 dB; |
| } | | |
| No.OFDMA Symbols | | |
| No.Subchannels | | |
| } | | |
| Repetition Coding Indication | | 0b00: No repetition coding 0b01: Repetition coding of 2 used 0b10: Repetition coding of 4 used 0b11: Repetition coding of 6 used |
| } | | |
| } | | |

Referring to Table 2, the DIUC is used for assigning a burst. The CID field indicates whether the corresponding DL-MAP IE is being used for a Broadcast transmission, a Multicast transmission, or a Unicast transmission. More specifically, in case the M2M Management CID, which is shown in Table 1, is inserted in the CID field of Table 2, the corresponding DL-MAP IE is used for assigning a resource region, to which a MAC control message respective to an M2M device is transmitted.

The DL-MAP IE may include resource assignment information for assigning a resource region, to which the MAC control message is being transmitted. At this point, the resource assignment information may include an OFDMA Symbol Offset field, a Subchannel Offset field, a Boosting field, the number of OFDMA symbol(s) field (No. of OFDMA symbol), the number of Subchannels field (No. of Subchannel), and a Repetition Coding Indication field.

The OFDMA Symbol Offset field indicates the offset of an OFDMA (Orthogonal Frequency Division Multiple Access) symbol belonging to a burst, to which the corresponding resource region is assigned. Moreover, the OFDMA symbol offset is calculated starting from an DL symbol, through which a preamble is being transmitted.

The Subchannel Offset field indicates a lowermost index of an OFMDA subchannel, which is used for accompanying the corresponding burst.

The Boosting field is used for performing power boosting on the corresponding assigned data subcarriers. The Boosting field is set to '0' in an AAS region (or zone), which corresponds an AMC permutation region, an AMC region, or a PUSH-ASCA permutation region (or zone), which uses a dedicated pilot.

The No. of OFDMA Symbol(s) field indicates the number of OFDMA symbols, which are accompanied by a downlink physical burst (DL PHY burst). The value of the OFDMA symbols field may be applied as a multiple of a slot length in the corresponding symbol. The No. of subchannels field corresponds to continuous index indicating the number of continuous subchannels, which are accompanied by a downlink physical burst.

The repetition coding indication field indicates repetition coding, which is used in the assigned resource region (i.e., burst). For the DIUC, which indicates QPSK modulation, repetition coding is performed only once.

(2) M2M Device Group MAC Control (MGMC) Message

Hereinafter, an MGMC (M2M device Group MAC Control) message, which may be used in the exemplary embodiment of the present invention will be described in detail.

The MGMC message is being transmitted to a group of user equipments (i.e., M2M devices), each belonging to the same M2M device group (defined by the M2MCID), for the parameters and/or for indication. The ABS may transmit an MGMC message to the user equipments, which are in a connection state other than the idle mode, by using a broadcast method or a multicast method.

Table 3 shown below shows a list of exemplary MAC control messages

TABLE 3

| No. | Message name | Message description | Connection |
|---|---|---|---|
| ... | ... | | |
| 110 | MOB-MTE-IND | Multicast Transmission End Indication message | Broadcast |
| 111 | MGMC | M2M Group MAC control message | Broadcast |
| 112 | MAMC | M2M ACK MAC control message | Basic |
| 113-255 | | Reserved | |

Table 4 shown below shows an MGMC (M2M Group MAC control) message format.

TABLE 4

| Field | Size(bit) | Contents |
|---|---|---|
| MGMC_message_format( ){ | | |
| Management Message Type = 111 | 8 | |
| Num_M2MCID | TBD | Number of M2MCID |
| for(i=1;i<=Num M2MCID;i++){ | | |
| M2MCID | 16 | |
| Action Code | 2 | Used for identifying the purpose of the corresponding message0b00: Reassignment value of M2MCID0b01-0b11: reserved |
| If (Action Code==0x00){ | | |
| New M2MCID | 16 | Value of new M2MCID that is to be assigned. |
| } | | |
| } | | |
| } | | |

The base station uses an MGMC message including an M2MCID in order to transmit information for multiple user equipments (e.g., M2M devices). More specifically, the MGMC message is transmitted to M2M devices belonging to an M2M device group, which is indicated by the M2MCID. When the MGMC message is transmitted by using the broadcast manner, the M2M Management CID is used for transmitting the MGMC message. If the MGMC message is accompanied by control information for a single M2M device group, and if a multicast SA (Security Association) is set-up for the corresponding M2M device group, the corresponding MGMC message may be encrypted by using the predetermined multicast SA.

A physical burst (PHY burst) including a MAC PDU (Medium Access Control Protocol Data Unit), which carries the MGMC message respective to a single M2M device group, may be indicated by the M2MCID, which is included in the DL-MAP IE. At this point, the CID field of a MAC header belonging to the MAC PDU may be determined (or set) for any M2MCID, with the exception for the M2MCID being assigned to the corresponding M2M device. In addition, an EC (Encryption Control) field of the MAC header is respectively set to 0 or 1, depending upon whether or not the MGMC message is encrypted. In case the MGMC message is encrypted, a multicast SA corresponding to the M2M device group, which is identified by the M2MCID, is used for de-encrypting (or decrypting) the MGMC message.

The MAC PDU corresponds to a transmission unit that is used in a MAC layer, and, when transmitted from the physical layer (PHY), the MAC PDU is transmitted in a multicast burst format.

(4) Multicast Transmission End Indication (MOB-MTE-IND) Message

Hereinafter, an MOB-MTE-IND (Multicast Transmission End Indication) message that may be used by the exemplary embodiments of the present invention will be described in detail.

While the base station transmits a multicast message to a user equipment, which is being operated in an idle mode, when there is no multicast message that is to be transmitted to the user equipment (e.g., M2M device), the base station may use the M2MCID to transmit the MOB-MTE-IND message to the user equipment by using the broadcast manner or the multicast manner. When the user equipment operating in the idle mode receives the MOB-MTE-IND message, the corresponding user equipment re-enters a paging unavailable interval.

Table 5 shown below shows an exemplary MOB-MTE-IND message format that is used in the exemplary embodiments of the present invention.

TABLE 5

| Syntax | Size (Bit) | Contents |
|---|---|---|
| MOB_MTE-IND_Message_Format( ){ | | |
| Management message type = 110 | 8 | |
| M2MCID | 16 | M2MCID related to multicast traffic. The same M2MCID is used for a multicast service flow of all M2M devices belonging to an M2M device group. |
| } | | |

Referring to Table 5, the MOB-MTE-IND message includes a management message type field, which indicates a management message type, and an M2MCID field, which indicates the corresponding multicast traffic. When the MOB-MTE-IND message is being transmitted by using the broadcast method, a physical layer (PHY) burst carrying the MOB-MTE-IND message may be transmitted in accordance with the DL-MAP IE.

The base station uses the MOB-MTE-IND message including the M2MCID in order to transmit information on multiple terminals (e.g., M2M devices). More specifically, the MOB-MTE-IND message is transmitted to M2M devices belonging to an M2M device group, which is indicated by the M2MCID.

In case the MOB-MTE-IND message is transmitted by using the broadcast manner, the M2M management CID is used for transmitting the MOB-MTE-IND message. If the MOB-MTE-IND message is accompanied by control information for a single M2M device group, and if a multicast SA (Security Association) is set-up for the corresponding M2M device group, the corresponding MOB-MTE-IND message may be encrypted by using the predetermined multicast SA.

A physical burst (PHY burst) including a MAC PDU (Medium Access Control Protocol Data Unit), which accompanies the MOB-MTE-IND message for a single M2M device group, may be indicated by the M2MCID included in the DL-MAP IE. At this point, the CID field of a MAC header belonging to the MAC PDU may be determined (or set) for any M2MCID, with the exception for the M2MCID being assigned to the corresponding M2M device. In addition, an EC (Encryption Control) field of the MAC header is respectively set to 0 or 1, depending upon whether or not the MOB-MTE-IND message is encrypted. In case the MOB-MTE-IND message is encrypted, a multicast SA corresponding to the M2M device group, which is identified by the M2MCID, is used for de-encrypting (or decrypting) the MOB-MTE-IND message.

The MAC PDU corresponds to a transmission unit that is used in a MAC layer, and, when transmitted from the physical layer (PHY), the MAC PDU is transmitted in a multicast burst format.

5. Multicast Operations Respective to an M2M Device (1) Multicast Operations in General A multicast service for an M2M device provided by a base station (ABS) supports simultaneous (or synchronous) transmission of DL data to M2M devices belonging to the same M2M device group by using an M2MCID. A multicast service is associated with the ABS is provided only in a downlink. Each multicast connection is provided along with a QoS for the corresponding service flow and traffic parameters. Service flows accompanying multicast data are initiated by individual M2M devices participating in the corresponding service in a connected state. At this point, the M2M devices acquire parameters identifying a service flow related to the corresponding service.

The same M2MCID is assigned to a group of M2M devices participating in the same multicast service, and the corresponding MGID is assigned during a DSA (Dynamic Service Addition) process. During the service flow set-up process, the corresponding service flow is assigned to the M2MCID, which identifies a multicast service flow. By establishing a multicast connection with each of the M2M devices, the base station sets up a DL multicast service related to the corresponding service.

The M2M device maintains the M2MCID in the Normal Mode (e.g., connected state) and the Idle Mode, and the base station provides a mapping between the service flow and the M2MCID during the DSA process. Additionally, the base station may use an M2MCID Update TLV, so as to change such mapping relation during the DSC process or a network re-entry process.

(2) M2M Multicast Operation in an Idle Mode

The M2M base station may provide a multicast service to an M2M device operating in the Idle Mode, with or without a request for network re-entry. Before the base station transmits downlink (DL) multicast data, the base station may transmit a paging message, which include a multicast traffic indication, to the M2M device during the paging listening interval. If the M2M device receives the paging message, which indicates the M2M device to receive the multicast traffic without network re-entry, and if the corresponding paging message does not include information on a Multicast Transmission Start Time, the corresponding M2M device may start receiving the DL multicast data without ending (or deactivating) the Idle Mode.

The Multicast Transmission Start Time included in the paging message indicates a time point at which the DL multicast data, which are designated to be transmitted by the base station, are to be transmitted. The MTST (Multicast Transmission Start Time) value shall be smaller than a start time value of a next paging listening interval of the M2M device, which has received the paging message (e.g., MOB-PAG-ADV). The M2M device may turn its power off until a specific frame indicated by the Multicast Transmission Start Time, which is included in the paging message. And, once the multicast data transmission is ended, the base station transmits the MOB-MTE-IND message to the corresponding M2M device. The M2M device may enter a paging un-available interval as soon as the M2M device receives the MOB-MTE-IND message.

6. Method for Broadcasting M2M Broadcast MAC Control Message

As described above, in an M2M multicast service, an MOB-MTE-IND message is defined as a message, which is being transmitted in order to notify the end (or completion) of a multicast traffic. And, an MGMC message is defined in order to simultaneously update an M2MCID for all user equipments belonging to the same group. As MAC control messages, the MOB-MTE-IND message and MGMC messages may be transmitted from the base station by using the broadcast manner or the multicast manner.

The MAC control messages that are conventionally transmitted were not differentiated as messages corresponding to M2M devices and general user equipments, but were only differentiated as messages being transmitted via multicast transmission or broadcast transmission. Accordingly, when the MOB-MTE-IND message or the MGMC message is/are broadcasted by using the conventional method, not only the M2M devices but also the general user equipments (AMSs, UEs and MS/SSs) decode the broadcast messages designated for the M2M communication. This may least to an unnecessary (or excessive) increase in a broadcast burst decoding overhead.

Therefore, according to the exemplary embodiments of the present invention, in order to reduce unnecessary burst decoding overhead of general user equipments, and in order to reduce an unnecessary decoding process of the M2M devices, diverse methods for transmitting MAC control messages by using a broadcast method will hereinafter be described in detail.

Figure 3:
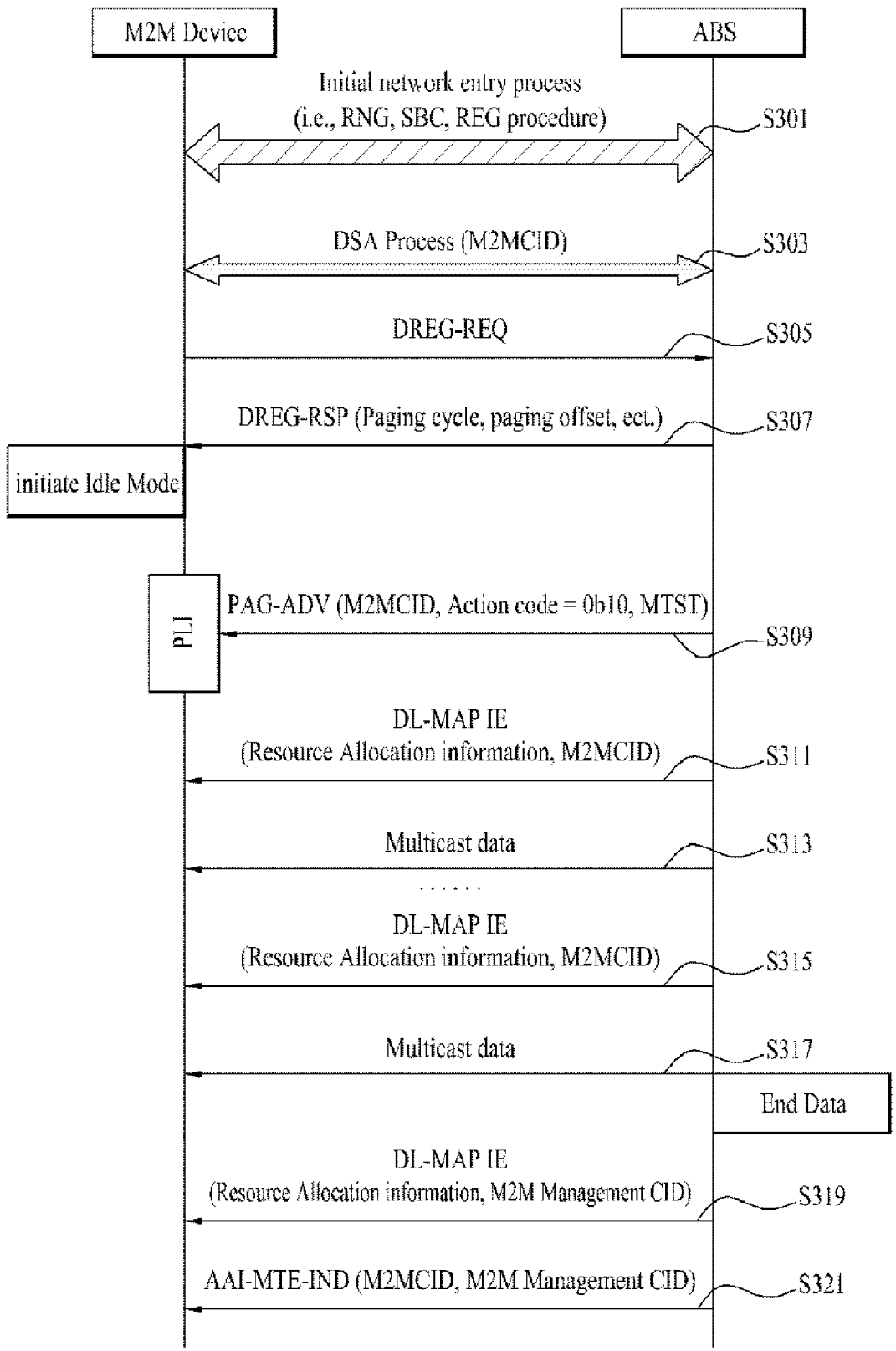
FIG. 3 illustrates one of many methods for transmitting a MAC control message in a multicast manner according to an exemplary embodiment of the present invention.

FIG. 3 illustrates one of many methods for transmitting a MAC control message in a broadcast manner according to an exemplary embodiment of the present invention.

The M2M device may perform an initial network entry process with the base station (ABS). As the initial network entry process, an initial ranging process (MOB-RNG-REQ/RSP), a basic subscriber station capability negotiation process (MOB-SBC-REQ/RSP), and a network registration process (MOB-REG-REQ/RSP) may be performed (S301).

After performing the initial network entry process, the M2M device may perform a process of creating a service flow with the base station, in order to be provided with a specific service. For example, the M2M device may perform a dynamic service addition process (DSA process) with the base station. At this point, when multicast data are required to be transmitted to the M2M device through by performing the DSA process, the base station may assign a multicast connection identifier (M2MCID) (S303).

Subsequently, when the M2M device does not have any data that are to be transmitted to the base station or received from the base station, the M2M device transmits a de-registration request (DREG-REQ) message in order to enter the Idle Mode (S305).

In addition, the base station may transmit a de-registration response (DREG-RSP) message including paging information, such as a paging cycle period, a paging offset, and so on, to the M2M device as a response to the de-registration request message. Reference may be made to the description of the Idle Mode operation of Section 1 and to FIG. 2 for the detailed description of the Idle Mode operation (S307).

After receiving the DREG-RSP message, the M2M device may enter the Idle Mode, and the M2M device may receive a paging message (e.g., MOB-PAG-ADV) message from the base station during the PLI (Paging Listening Interval). At this point, the paging message (e.g., MOB-PAG-ADV) may include a multicast traffic indicator, which indicates a multicast traffic transmission, (e.g., Action code=0b10), information on a M2M group, which is scheduled to receive the multicast traffic (or multicast data), (e.g., M2MCID), and information on a start time at which the multicast traffic is transmitted (MTST: Multicast Traffic Start Time) (S309).

At this point, when the M2MCID, which is received by the M2M device, indicates the M2M group to which the corresponding M2M device belongs, and when the operation code of the paging message (i.e., multicast traffic indicator) is set to 0b10, the processor (120) of the M2M device may control the corresponding M2M device to be in a stand-by mode, in order to receive the multicast data (traffic) without network re-entry.

Therefore, the M2M device receives a DL-MAP IE, which includes resource assignment information indicating a resource region, to which the multicast data are transmitted, at a time point indicated by the MTST. At this point, the DL-MAP IE includes an M2MCID respective to the multicast data that are to be transmitted to the M2M device (S311, S315).

Then, the M2M device may receive multicast data through a resource region, which is indicated by the resource assignment information included in the DL-MAP IE. At this point, a MAC header of the MAC PDU, to which the multicast data are transmitted, may include an M2MCID indicating the transmission of the corresponding multicast data (S313, S317).

After transmitting the last multicast data to the M2M device, it is preferable that the base station direct (or indicate) a multicast data transmission end to the M2M device. Accordingly, the base station may transmit a DL-MAP IE including resource assignment information indicating a resource region for transmitting the MOB-MTE-IND message, which is used for indicating a multicast data transmission end, and including an M2M management CID to the M2M device (S319).

More specifically, the DL-MAP IE may include resource assignment information indicating a resource region for transmitting the MOB-MTE-IND message (ref. Table 2). Additionally, when the M2M Management CID is included in the DL-MAP IE, only the M2M devices that are assigned with the corresponding M2M Management CID may be capable of decoding the corresponding DL-MAP IE. Accordingly, in order to transmit the DL-MAP IE only to the M2M device belong to the M2M device group, to which the multicast data are transmitted, the base station may insert the M2M Management CID in the CID field of the DL-MAP IE.

In FIG. 3, only one M2M device is illustrated. However, this is merely an example given to facilitate the description of the exemplary embodiment of the present invention.

When the M2M device of FIG. 3 normally (or successfully) receives the DL-MAP IE, which is transmitted in step S319, the corresponding M2M device may receive the MAC control message (i.e., MOB-MTE-IND) message, which indicates the multicast data transmission end, through a resource region indicated by the resource assignment information being included in the DL-MAP IE (S321).

At this point, in step 321, the MOB-MTE-IND message may be carried in the MAC PDU so as to be transmitted, and an M2M Management CID may be included in a MAC header (e.g., AGMH) of the MAC PDU. Moreover, in case the MOB-MTE-IND message is transmitted in a broadcast manner, the M2M Management CID used in step S319 may be used herein.

In addition, when an encryption control (EC) field of the MAC PDU indicates that the corresponding MAC PDU is being encrypted, it may be determined that the payload of the corresponding MAC PDU carries an encrypted MAC control message. Therefore, by using the M2M Management CID, the M2M device may determine whether or not the corresponding MAC PDU corresponds to a broadcast burst for the M2M device. And, by using the EC field, the M2M device may verify (or determine) whether or not the MAC control message, which is carried in the MAC PDU, is encrypted.

Evidently, the MAC header of a MAC PDU, which is accompanied by (or carries) the MOB-MTE-IND message, may include the M2MCID that identifies the group of the corresponding M2M device, and a payload of the MAC PDU may include the M2M Management CID.

In step 321, when the M2M device receives an MOB-MTE-IND message notifying that the multicast data transmission has ended, the processor (120) of the M2M device may control the M2M device to enter the unavailable interval.

Figure 4:
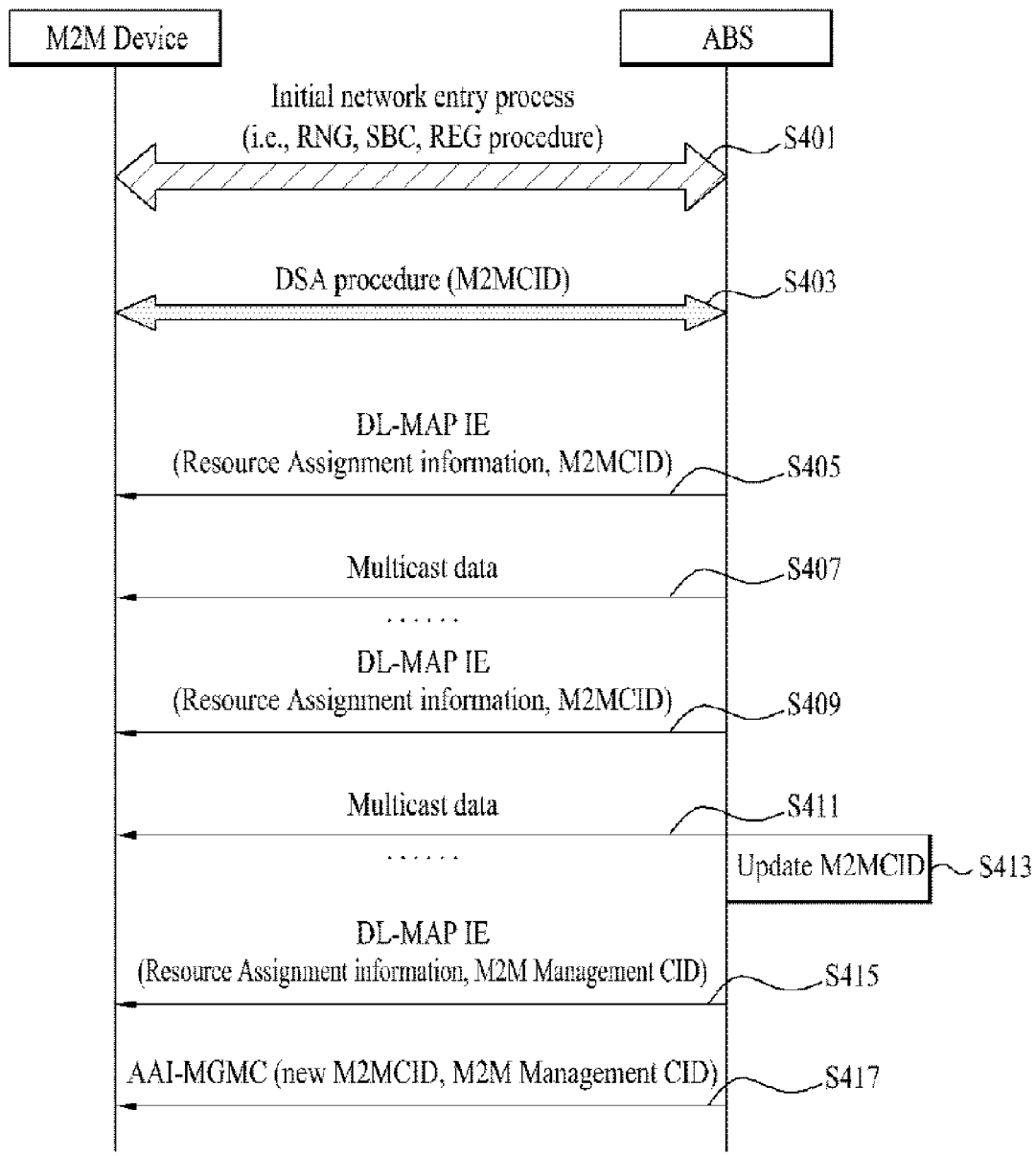
FIG. 4 illustrates another one of many methods for transmitting a MAC control message in a broadcast manner according to the exemplary embodiment of the present invention.

FIG. 4 illustrates another one of methods for transmitting a MAC control message in a broadcast manner according to the exemplary embodiment of the present invention.

The processes corresponding to step S401 to step S411 are very similar to the processes corresponding to step S301 to step S317. Therefore, reference may be made to the description of FIG. 3 for detailed description of the processes corresponding to step S401 to step S411. However, since the M2M device of FIG. 4 is currently being operated in a general mode, the M2M device does not perform the processes corresponding to step S305 step S307. More specifically, the M2M device does not operate in the idle mode and is in a Connected State with the base station.

After the base station transmits the multicast data to the M2M device, a multicast group identifier may be required to be updated (S413).

Therefore, in order to transmit the updated M2MCID to the M2M devices belonging to the corresponding multicast group, the base station is required to transmit an MGMC message including the newly updated M2MCID to the M2M device. In order to do so, the base station may transmit a DL-MAP IE including the resource assignment information, which indicates the resource region for transmitting the multicast MAC control message (i.e., MGMC) respective to the M2M devices, to the M2M device (S415).

In step S415, the DL-MAP IE may have the format described in Table 2. In the connected state, by verifying the M2MCID and/or the M2M Management CID, which are/is included in the CID field, the M2M device, which has received the DL-MAP IE of step S415, may verify that the corresponding DL-MAP IE belongs to the M2M device. Accordingly, the M2M device may receive the MGMC message, which corresponds to a MAC control message, through an assignment region indicated by a broadcast assignment information included in the DL-MAP IE (S417).

In step S417, the AAI-MGMC message, which corresponds to the MAC control message, may be transmitted by using the MAC PDU. At this point, the CID field, which is included in the MAC header (e.g., AGMH) of the MAC PDU, may include an M2M Management CID or an M2MCID, which are used for indicating that the corresponding MAC PDU carries a MAC control message respective to the M2M device. And, additionally, the EC field of the MAC header may indicate whether or not a payload of the corresponding MAC PDU is encrypted.

If a general user equipment receives the DL-MAP IE of step S417, since the general user equipment does not have an M2MCID and/or an M2M Management CID, the general user equipment is incapable of decoding the corresponding DL-MAP IE. Therefore, the general user equipment may not receive the DL-MAP IE and the MGMC message.

Evidently, the MAC header of the MAC PDU, which carries the MGMC message, my include an M2MCID, which identifies the group to which the M2M device belongs. And, an M2M Management CID may be included in the payload of the MAC PDU.

Figure 5:
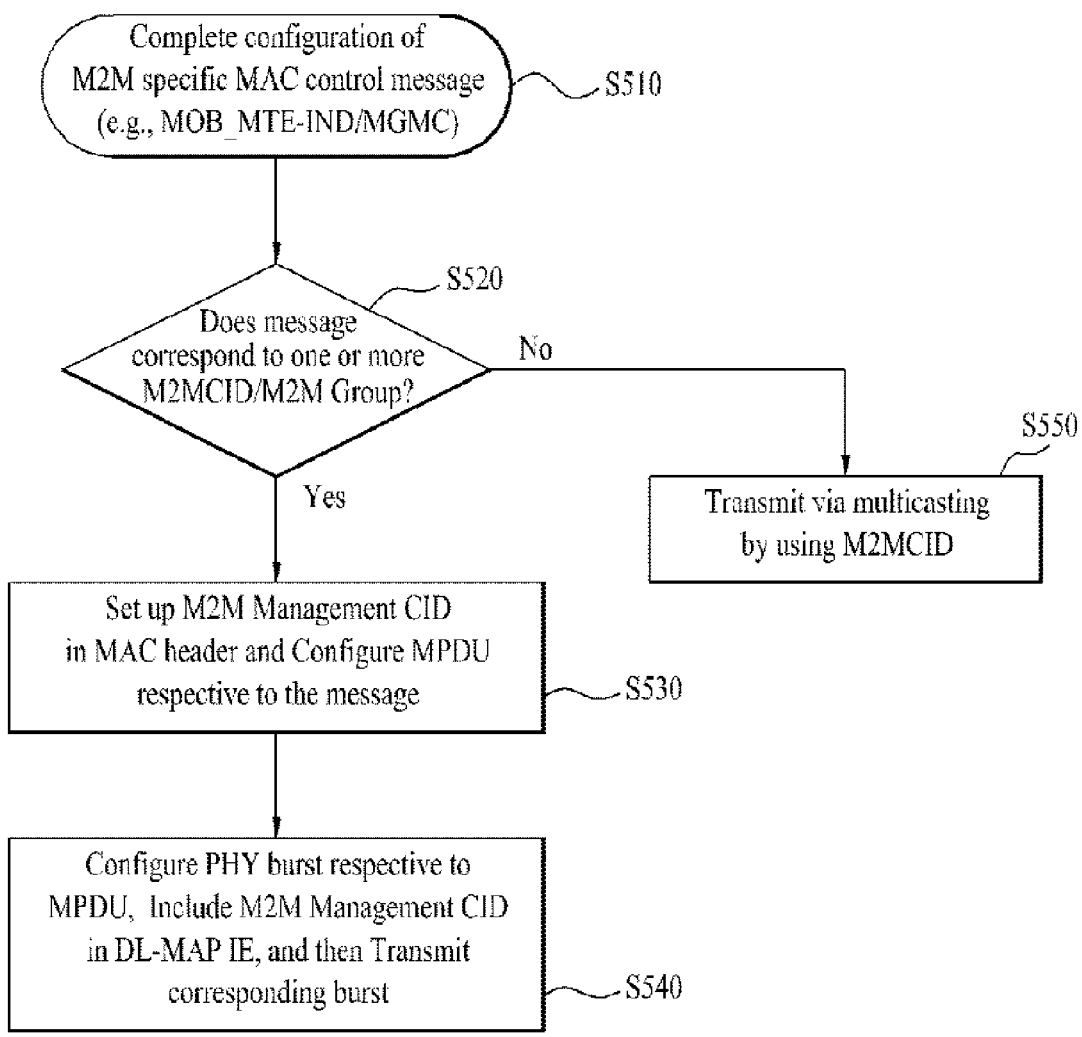
FIG. 5 illustrates a flow chart showing a process of having a base station transmit a MAC control message in a broadcast manner according to the exemplary embodiment of the present invention.

FIG. 5 illustrates a flow chart showing a process of having a base station transmit a MAC control message in a broadcast manner according to the exemplary embodiment of the present invention.

FIG. 5 may be applied to the exemplary embodiments of the present invention described with reference to FIG. 3 and FIG. 4. More specifically, the base station according to the exemplary embodiments described in FIG. 3 and FIG. 4 may transmit the MAC control message to the M2M device through the process of FIG. 5.

Referring to FIG. 5, an M2M specific MAC control message is configured in the base station (S510).

The base station determines whether or not the corresponding MAC control message corresponds to a MAC control message for one or more M2MCIDs, or to a MAC control message for one or more M2M groups, which is/are specified by the M2MCID (S520).

If it is determined in step S520 that the MAC control message corresponds to a MAC control message for one M2M group, the base station transmits the corresponding MAC control message in a multicast manner by using the M2MCID (S550).

If it is determined in step S520 that the MAC control message corresponds to a MAC control message respective to one or more M2M groups, the base station may set-up (or determine) an M2M Management CID in the CID field of a MAC header belonging to the MAC PDU, which carries in the corresponding MAC control message, so as to configure the MAC PDU (S530).

Furthermore, after configuring the PHY burst for the MAC PDU (i.e., MPDU), the base station may determine an M2M Management CID in the CID field of the DL-MAP. Subsequently, the base station may transmit a DL-MAP IE including the resource assignment information, which indicates the resource region to which the PHY burst is to be transmitted, and the M2M Management CID to the M2M devices. Thereafter, the base station transmits the MAC PDU, which carries the MAC control message and the M2M Management CID, to the M2M device in a broadcast format by using the resource region that is indicated by the resource assignment information (S540).

Figure 6:
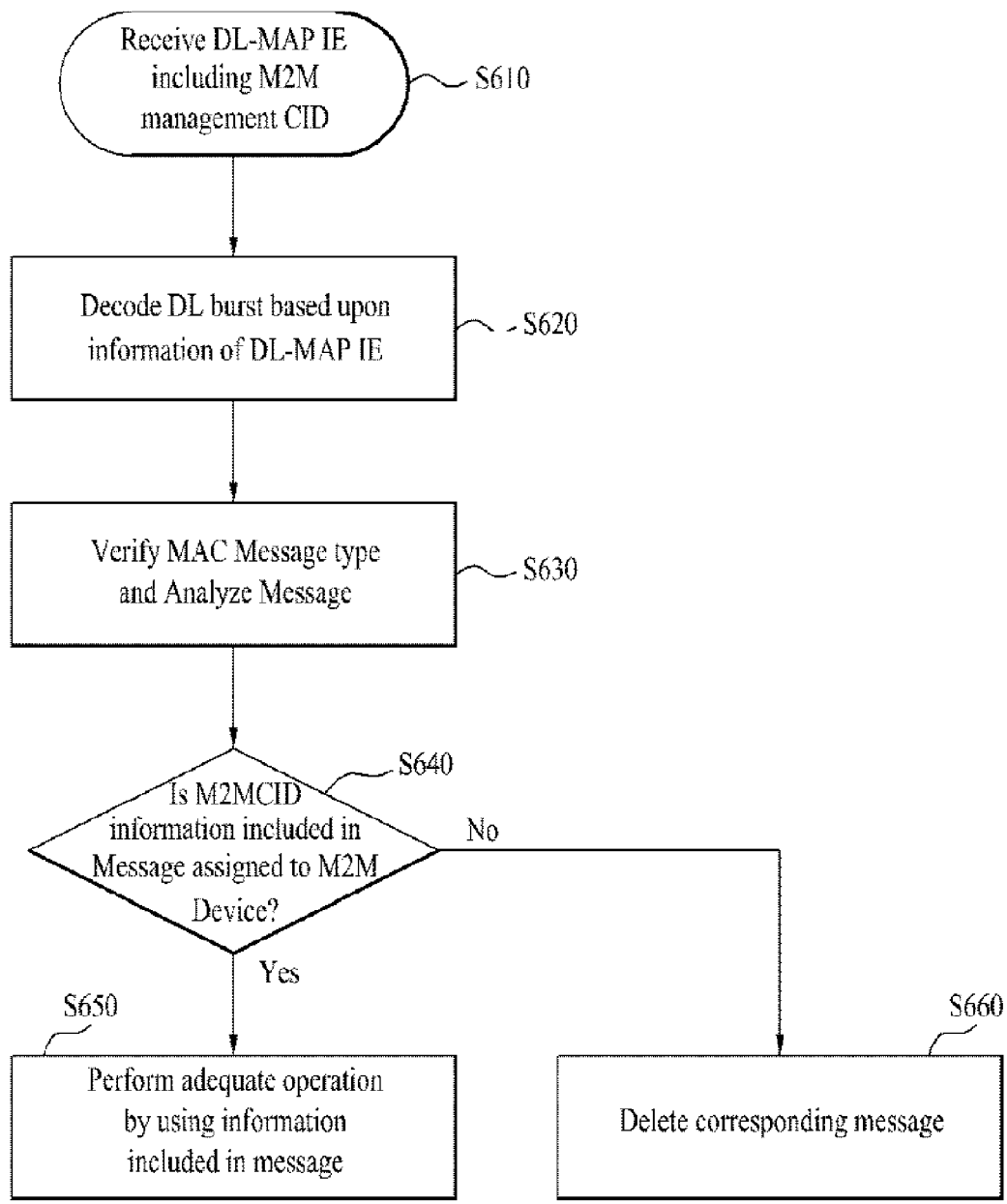
FIG. 6 illustrates a flow chart showing a process of having an M2M device receive a MAC control message in a broadcast manner according to the exemplary embodiment of the present invention.

FIG. 6 illustrates a flow chart showing a process of having an M2M device receive a MAC control message in a broadcast manner according to the exemplary embodiment of the present invention.

FIG. 6 may be applied to the exemplary embodiments of the present invention described with reference to FIG. 3 and FIG. 4. More specifically, the M2M device according to the exemplary embodiments described in FIG. 3 and FIG. 4 may receive the MAC control message to the M2M device through the process of FIG. 6. FIG. 6 describes the exemplary embodiments of the present invention in the view point of the M2M device, which corresponds to the view point of the base station being described in FIG. 5.

Referring to FIG. 6, the M2M device may use the M2M Management CID, which is included in the M2M device itself, so as to receive the DL-MAP IE. At this point, since the M2M Management CID is assigned with a predetermined value within the system, the M2M Management CID may be assigned only to the M2M devices (S610).

Accordingly, all M2M devices may be capable of receiving the DL-MAP IE including the M2M Management CID. Also, the M2M device may decode a DL burst accompanying the MAC PDU, which is broadcasted through the resource region indicated by the resource assignment information included in the DL-MAP IE (S620).

At this point, the header of the MAC PDU may include an M2M Management CID, which enables only the M2M devices to decode the corresponding MAC PDU. Moreover, the M2M device verifies a MAC message type field included in the MAC PDU, so as to analyze the corresponding MAC control message (S630).

The MAC control message, which is carried in the payload of the MAC PDU, may include an M2MCID, which indicates an M2M group to which the corresponding M2M device belongs. More specifically, the M2M device determines whether or not the MAC control message includes the M2MCID, which is assigned to the corresponding M2M device (S640).

In case the M2M control message includes the M2MCID, which is assigned to the corresponding M2M device, the M2M device may decode the M2M control message, so as to perform an operation indicated by the decoded message. For example, in case the MAC control message accompanying the MAC PDU corresponds to the MOB-MTE-IND message, the M2M device stops the process of receiving the multicast data and enters the paging unavailable interval. Furthermore, in case the MAC control message corresponds to the MGMC message, the M2M device may update a new M2MCID, which is included in the MGMC message.

As described in the exemplary embodiments of the present invention, as an identifier being assigned to all M2M devices, the M2M Management CID is used for transmitting a control message respective to the M2M device. More specifically, a message including the M2M management CID may be received by all M2M devices. However, an M2M group, to which specific M2M device belong, may be identified by using the M2MCID. And, a specific M2M device may receive a MAC control message including an M2MCID that matches with the M2MCID assigned to the corresponding specific M2M device.

Furthermore, the present invention may be realized in another concrete configuration (or formation) without deviating from the scope and spirit of the essential characteristics of the present invention. Therefore, in all aspect, the detailed description of present invention is intended to be understood and interpreted as an exemplary embodiment of the present invention without limitation. The scope of the present invention shall be decided based upon a reasonable interpretation of the appended claims of the present invention and shall come within the scope of the appended claims and their equivalents. Therefore, it is intended that the present invention covers the modifications and variations of this invention provided they come within the scope of the appended claims and their equivalents, and it is not intended to limit the present invention only to the examples presented herein. Furthermore, claims that do not have any explicit citations within the scope of the claims of the present invention may either be combined to configure another embodiment of the present invention, or new claims may be added during the amendment of the present invention after the filing for the patent application of the present invention.

INDUSTRIAL APPLICABILITY

The above-described embodiments of the present invention may be applied to a wide range of wireless access systems. Examples of the diverse wireless access systems may include 3GPP (3rd Generation Partnership Project) systems, 3GPP2 systems, and/or IEEE 802.xx (Institute of Electrical and Electronic Engineers 802) systems, and so on. In addition to the diverse wireless access systems, the exemplary embodiments of the present invention may also be applied to all technical fields applying and adopting the diverse wireless access systems.

The invention claimed is:

1. A method for broadcasting a control message for a Machine to Machine (M2M) device in a wireless access system, the method comprising:
   receiving a downlink MAP information element (IE) comprising resource assignment information indicating a resource region to which the control message is being broadcast and an M2M management Connection IDentifier (CID); and
   receiving the control message which is carried by a Medium Access Control Protocol Data Unit (MAC PDU) through the resource region,
   wherein the MAC PDU includes the M2M management CID and an M2M connection identifier (M2MCID) identifying an M2M multicast connection for M2M devices,
   wherein the M2M management CID is used in the downlink MAP IE to indicate bursts used for transmission of the MAC PDU carrying the control message for the M2M devices and is used in the control message, and
   wherein the M2M management CID is defined for transmitting the control message only to the M2M devices.

2. The method of claim 1,
   wherein the M2M management CID is included in a MAC header, the MAC header being included in the MAC PDU, and
   wherein the M2MCID is included in a payload, the payload being included in the MAC PDU.

3. The method of claim 2, wherein the MAC header further comprises an encryption control (EC) field indicating whether or not the control message is encrypted, the control message being included in the payload.

4. The method of claim 1, wherein the control message is an M2M multicast end indication (MOB-MTE-IND) message or an M2M group MAC control (MGMC) message.

5. A method for broadcasting a control message for a Machine to Machine (M2M) device in a wireless access system, the method comprising:
   transmitting a downlink MAP information element (IE) comprising resource assignment information indicating a resource region to which the control message is being broadcast and an M2M management Connection IDentifier (CID); and
   transmitting the control message which is carried by a Medium Access Control Protocol Data Unit (MAC PDU) through the resource region,
   wherein the MAC PDU includes the M2M management CID and an M2M connection identifier (M2MCID) identifying an M2M multicast connection for M2M devices,
   wherein the M2M management CID is used in the downlink MAP IE to indicate bursts used for transmission of the MAC PDU carrying the control message for the M2M devices and is used in the control message, and
   wherein the M2M management CID is defined for transmitting the control message only to the M2M devices.

6. The method of claim 5,
   wherein the M2M management CID is included in a MAC header, the MAC header being included in the MAC PDU, and
   wherein the M2MCID is included in a payload, the payload being included in the MAC PDU.

7. The method of claim 6, wherein the MAC header further comprises an encryption control (EC) field indicating whether or not the control message is encrypted, the control message being included in the payload.

8. The method of claim 7, wherein the control message is an M2M multicast end indication (MOB-MTE-IND) message or an M2M group MAC control (MGMC) message.

9. A Machine to Machine (M2M) device for receiving a control message being broadcasted in a wireless access system, the M2M device comprising:
   a receiver; and
   a processor controlling the reception of the control message being broadcasted, wherein the M2M device is configured to:
      receive a downlink MAP information element (IE) by using the receiver,
      wherein the downlink MAP IE includes resource assignment information indicating a resource region to which the control message is being broadcast and an M2M management Connection IDentifier (CID); and
      receive the control messages which is carried by a Medium Access Control Protocol Data Unit (MAC PDU) by using the receiver through the resource region,
      wherein the MAC PDU includes the M2M management CID and an M2M connection identifier (M2MCID) identifying an M2M multicast connection for M2M devices,
   wherein the M2M management CID is used in the downlink MAP IE to indicate bursts used for transmission of the MAC PDU carrying the control message for the M2M devices and is used in the control message, and
   wherein the M2M management CID is defined for transmitting the control message only to the M2M devices.

10. The M2M device of claim 9,
    wherein the M2M management CID is included in a MAC header, the MAC header being included in the MAC PDU, and
    wherein the M2MCID is included in a payload, the payload being included in the MAC PDU.

11. The M2M device of claim 10, wherein the MAC header further comprises an encryption control (EC) field indicating whether or not the control message is encrypted, the control message being included in the payload.

12. The M2M device of claim 9, wherein the control message is an M2M multicast end indication (MOB-MTE-IND) message or an M2M group MAC control (MGMC) message.

13. A base station for broadcasting a control message to a Machine to Machine (M2M) device in a wireless access system, the base station comprising:
    a transmitter; and
    a processor controlling the broadcasting of the control message, wherein the base station is configured to:
       transmit a downlink MAP information element (IE) by using the transmitter, wherein the downlink MAP IE includes resource assignment information indicating a resource region to which the control message is being broadcast and an M2M management Connection IDentifier (CID); and
       transmit the control message which is carried by a Medium Access Control Protocol Data Unit (MAC PDU) by using the transmitter through the resource region,
       wherein the MAC PDU includes the M2M management CID and an M2M connection identifier (M2MCID) identifying an M2M multicast connection for M2M devices, and
    wherein the M2M management CID is used in the downlink MAP IE to indicate bursts used for transmission of the MAC PDU carrying the control message for the M2M devices and is used in the control message, and wherein the M2M management CID is defined for transmitting the control message only to the M2M devices.

14. The base station of claim 13,
wherein the M2M management CID is included in a MAC header, the MAC header being included in the MAC PDU, and
wherein the M2MCID is included in a payload, the payload being included in the MAC PDU.

15. The base station of claim 14, wherein the MAC header further comprises an encryption control (EC) field indicating whether or not the control message is encrypted, the control message being included in the payload.

16. The base station of claim 13, wherein the control message is an M2M multicast end indication (MOB-MTE-IND) message or an M2M group MAC control (MGMC) message.

* * * * *